United States Patent [19]

Meyer et al.

[11] 4,062,140
[45] Dec. 13, 1977

[54] SLIDE MOUNT

[75] Inventors: Herbert Meyer; Heinz Schienagel, both of Ansbach, Mfr., Germany

[73] Assignee: Bellman & Co. K.G., Ansbach, Mfr., Germany

[21] Appl. No.: 731,768

[22] Filed: Oct. 12, 1976

[30] Foreign Application Priority Data

Oct. 9, 1975 Germany ............................ 2545300

[51] Int. Cl.² ............................................... G09F 1/12
[52] U.S. Cl. ...................................................... 40/152
[58] Field of Search ..................... 40/152, 152.1, 158 B

[56] References Cited

U.S. PATENT DOCUMENTS 2,959,882 11/1960 Krull ...................................... 40/152
3,990,168 11/1976 Murray ................................. 40/152

Primary Examiner—Louis G. Mancene
Assistant Examiner—Wenceslao J. Contreras
Attorney, Agent, or Firm—Lewis H. Eslinger

[57] ABSTRACT

A slide mount comprises two substantially identical frame halves which are snap-fitted together. Each frame half has four interlocking elements which lock the frame halves together and each interlocking element comprises a semi-cylindrical male projection and a complementary semi-cylindrical female recess whereby the frame halves are interlocked by the male portions of each half engaging in the female recesses of the other half.

4 Claims, 2 Drawing Figures

*Fig. 1*
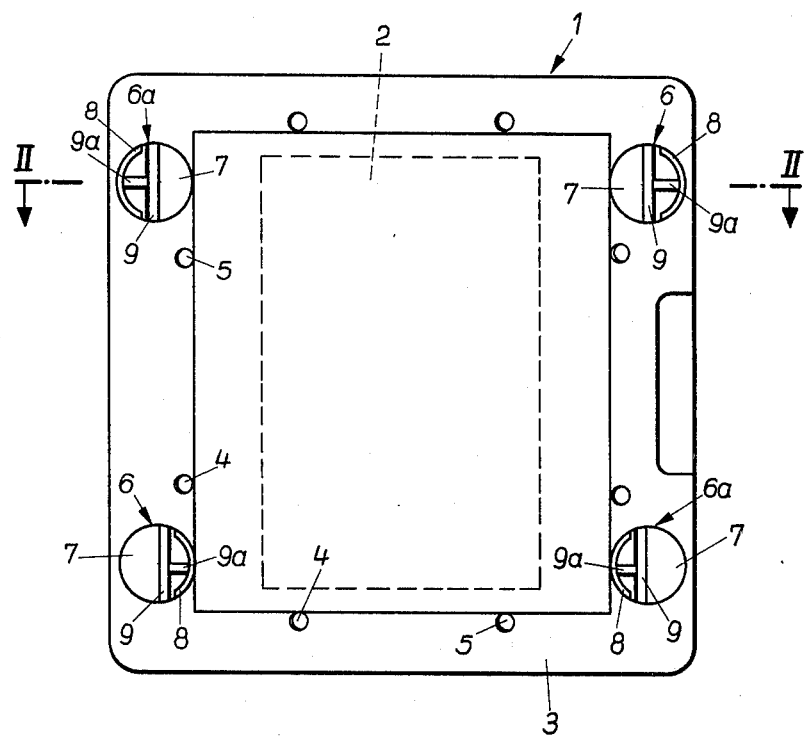
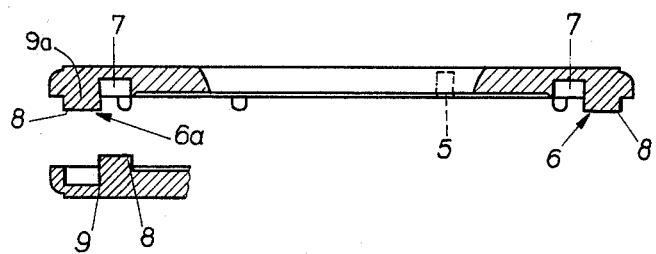
*Fig. 2*

SLIDE MOUNT

This invention relates to a slide mount for mounting a transparecny.

With the enormous number of commercially available types of frames or slide mounts for transparencies, there exists the problem that their manufacture is far too complicated and therefore too expensive. Frequently, frame-halves or frame-parts of various shapes have to be produced, and in the majority of cases these have to be provided with hinges and glass parts, to act as windows, have subsequently to be inserted into the picture cut-outs.

A further problem is presented by those components of the slide mounts which are concerned with providing a durable interconnection between the frame-halves. This problem arises because it should be possible to bring these frame-halves together rapidly and effortlessly, and in such a way that the inserted film portion seats correctly.

In the case of the conventional two-part frames there is the further danger of a diametric inversion, through 180°, of the front half of the frame relative to the rear half of the frame, so that on introducing the slide into a projection magazine, there is no guarantee that on projection the picture will not be upside down.

According to the present invention, there is provided a slide mount comprising a pair of substantially identical frame-halves, each frame half having integral therewith on that surface thereof which, in use, faces the other frame half, a plurality of interlocking elements for engaging with corresponding interlocking elements of the other frame half, for positively interlocking the frame halves with one another, each interlocking element comprising complementary male and female portions for engagement with corresponding ones of the female and male portions respectively, on the other of the frame halves, each male portion being in the form of a part-cylindrical projection and each female portion being in the form of a part-cylindrical recess.

The two frame-halves may thus be made in a single mould, by means of which a plurality of inconfusible frame-halves can be produced by continuous injection moulding, these frame-halves subsequently being joined to one another merely by pressing together and being inherently again detachable from one another.

Clearly, bearing in mind that the two frame halves are substantially identical, for the male portions of the interlocking elements of each frame half to be able to engage with the female portions of the interlocking elements of the other frame half, the orientation of the male and female portions cannot be the same for all the interlocking elements on each frame half. This assymetry prevents the two halves being assembled with one "the wrong way up".

The invention will be further described with reference to the accompanying drawings in which:

FIG. 1 is a plan view of one frame-half of a slide mount embodying the invention; and FIG. 2 is a sectional view taken along line II—II of FIG. 1.

In the FIGS, reference numeral 1 indicates generally one of two, preferably plastics, substantially identical frame halves which together make up a slide mount by being press-fitted together after the insertion of a transparency therebetween. One of the frame halves can, if desired, be marked with a legend such as "view from this side". The picture cut-out 2 is provided in the usual manner. In addition, each frame half 1 is provided with the conventional holder pegs 4 and the corresponding recesses or bores 5, for fixing, and for centering the transparency.

For firm but detachable positive interconnection of the two frame halves, press-stud-like interlocking elements 6 and 6a are moulded-on, which can be pressed onto one another in a snap-fit or as a press-seat. The arrangement of the press-stud-like elements 6 on those surfaces of the respective frame halves 1 which face one another in the assembled slide is such that, on congruent superposition, engagement of the interlocking elements is ensured in every case as soon as the frame halves 1 are pressed together at these points. This means that in each case the interlocking element 6 on each frame half interlock with the mirror image interlocking elements 6a on the other frame half. The join is made by the press-stud-like arrangement so that the two frame halves are snap-fitted together.

Each interlocking element 6, 6a consists of complementary male and female portions which are contiguous with one another. The male portions comprise hollow semi-cylindrical segments 8 with web portions 9 extending chordally thereof; preferably that surface of each web portion 9 which faces away from the associated segment 8 extends substantially diametrically thereof. The female portions of each frame half 1 comprise semi-cylindrical recesses 7 which receive the male portions of the interlocking elements 6, 6a of the other frame half. Each interlocking element is generally cylindrical in that the peripheral wall of the recess conforms circumferentially to approximately one half of a cylindrical surface, while the associated male portion conforms circumferentially to the remainder of such cylindrical surface.

The webs 9 are of undercut shape, in that they are each inclined with respect to the axis of the associated recess 7 such that the cross-section of each recess increases towards its floor. On pressing the cover parts 1 together, the mutually facing surfaces of the webs 9 of a pair of interlocking elements 6, 6a come into contact, whilst the outer walls of the segments 8 in each case snap into the corresponding peripheral wall surfaces of the recesses 7. For better stability and durability of the interlocking engagement, a transverse web 9a is provided between the webs 9 and the associated segments 8.

We claim:

1. A slide mount comprising a pair of substantially identically constructed frame halves, each frame half comprising a surface which, in the assembled condition of the mount, faces the other frame half and a plurality of interlocking elements on said surface for engaging with corresponding interlocking elements of the other frame half for positively interlocking the frame halves with one another, each interlocking element comprising mutually adjacent complementary male and female portions adapted to engage with female and male portions respectively of the corresponding interlocking element on the other of the frame halves, each female portion comprising means defining a part-cylindrical recess in said surface and each male portion comprising a hollow part-cylindrical portion and a web portion extending chordally of the hollow part-cylindrical portion and the web portions being disposed such that once the frame halves are interlocked, the web portions of corresponding, interlocked elements contact one another.

2. A slide mount according to claim 1 in which each male portion and each female portion is semi-cylindrical whereby each element conforms generally to a respective cylindrical surface.

3. A slide mount according to claim 2 wherein each recess defining means has an axis and a floor and the web portion of the associated male portion is inclined with respect to said axis such that the width of the recess increases towards the floor thereof.

4. A slide mount according to claim 1 wherein each male portion further comprises a transverse web disposed between the first mentioned web portion thereof and the part-cylindrical portion thereof.

* * * * *